(No Model.)

R. MULHOLLAND.
VEHICLE SPRING.

No. 315,053. Patented Apr. 7, 1885.

Witnesses.
Amos W. Sangster.
J. M. Caldwell.

Inventor.
Richard Mulholland
By James Sangster
Atty.

(No Model.) 2 Sheets—Sheet 2.

R. MULHOLLAND.
VEHICLE SPRING.

No. 315,053. Patented Apr. 7, 1885.

Witnesses.
Amos W. Sangster,
J. M. Caldwell.

Inventor.
Richard Mulholland
By James Sangster
Atty.

UNITED STATES PATENT OFFICE.

RICHARD MULHOLLAND, OF DUNKIRK, NEW YORK.

VEHICLE-SPRING.

SPECIFICATION forming part of Letters Patent No. 315,053, dated April 7, 1885.

Application filed July 24, 1884. (No model.)

*To all whom it may concern:*

Be it known that I, RICHARD MULHOLLAND, a citizen of the United States, residing in Dunkirk, in the county of Chautauqua and State of New York, have invented certain new and useful Improvements in Vehicle-Springs, of which the following is a specification.

The object of my invention is to produce a torsion-spring having that portion or portions which are subject to torsion made double, having an upper and lower portion, and a suitable means for securing the same, the construction being such that both portions are alike subject to torsion, so that the greatest amount of torsional action may be attained within a short space. A further object is to provide said spring with a coupling at its outer end, so that it may readily be connected with a leaf-spring, spring-bar, or its equivalent, all of which will be fully and clearly hereinafter shown and explained by reference to the accompanying drawings, in which—

Figure 1:
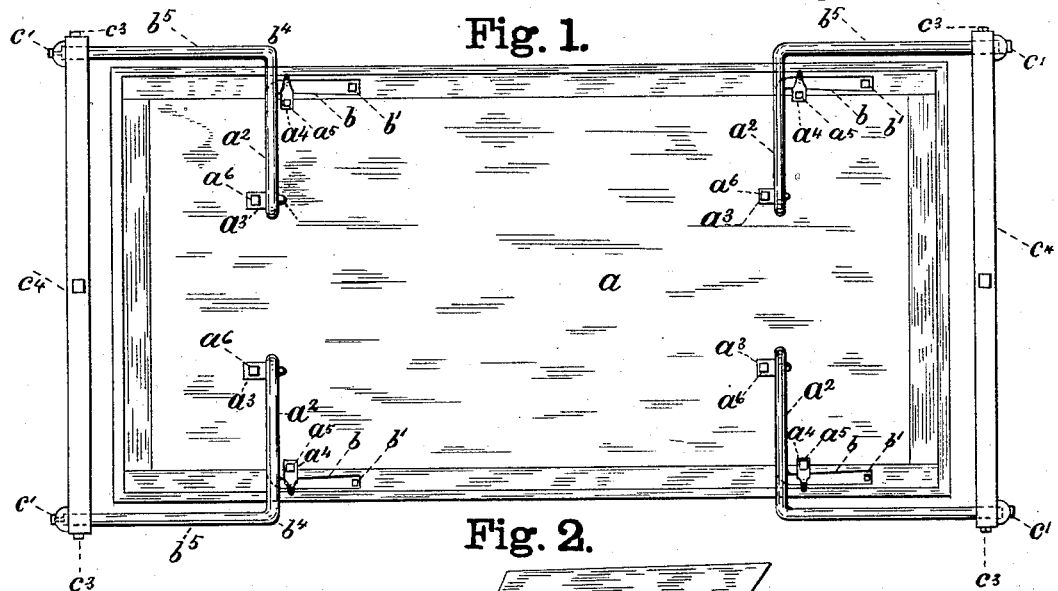
Figure 2:
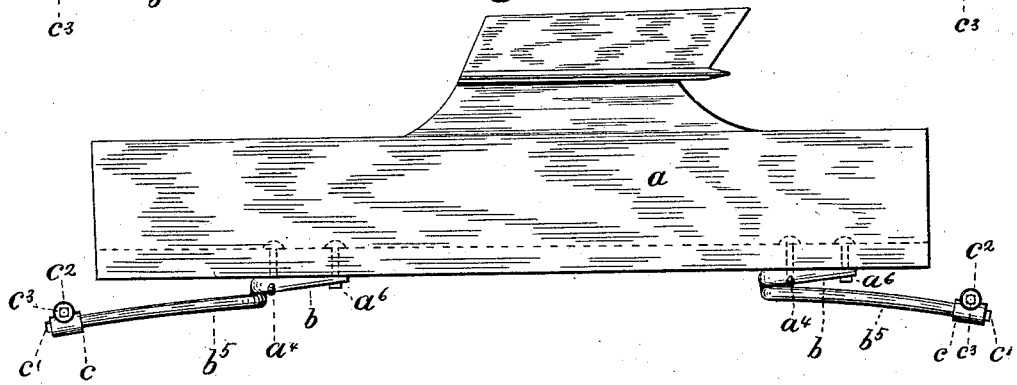
Figure 3:
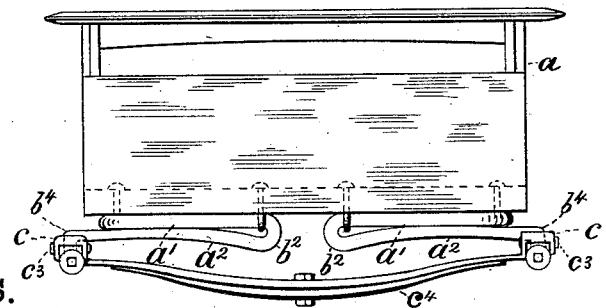
Figure 4:
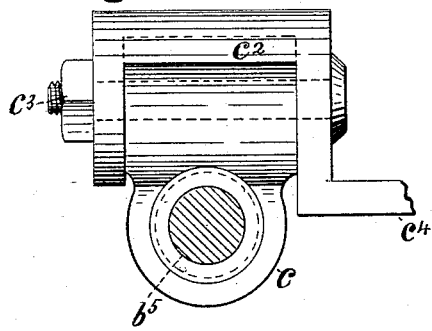
Figure 5:
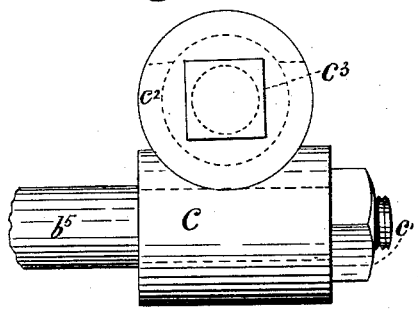
Figure 6:
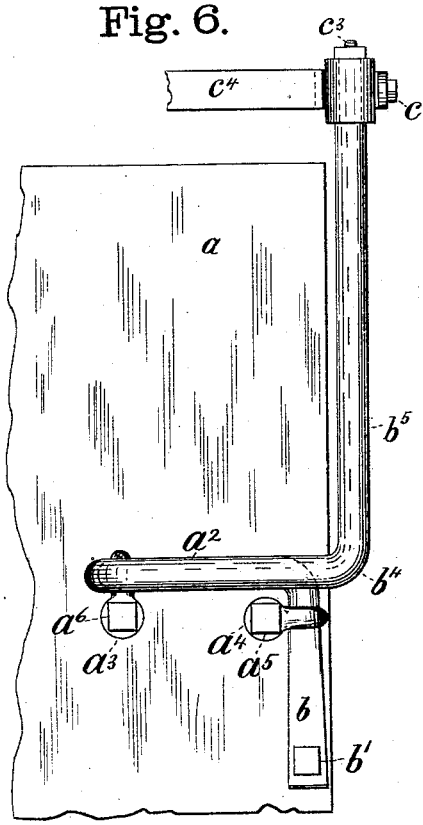
Figure 7:
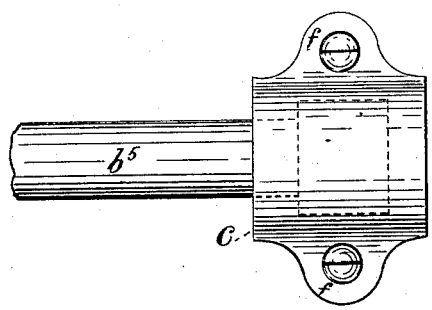

Figure 1 represents a bottom view of the body of a vehicle, showing a similar view of my invention connected thereto. Fig. 2 is a side elevation of the same. Fig. 3 is an end view. Fig. 4 is an enlarged end view of the coupling for connecting the springs. Fig. 5 is a side elevation of the same. Fig. 6 represents an enlarged bottom view of the torsion-spring, a portion of the vehicle to which it is connected, and a bottom view of the coupling for connecting the springs together. Fig. 7 is a modification of the coupling.

The body of the vehicle $a$ may be made in any well-known way. $a'$ $a^2$ represent the torsion-spring. The portion $a'$ is secured to the bottom of the vehicle by the plates $a^3$ $a^4$, which plates hook over the spring, as shown, and are secured in place by the bolts $a^5 a^6$, the inner end, $b$, of the spring being secured by a bolt, $b'$. The portion $a^2$ of the torsion-spring is formed by bending it back at or about the point $b^2$, so it will be in a line with the portion $a'$, or substantially so, and below it the outer part, $b^4$, of the spring is bent so that the part $b^5$ runs in a direction at right angles, or thereabout, from the portions $a' a^2$, and is then connected by a coupling, $c$, which is fitted to the outer end of the torsion-spring, so that it can revolve within it. As represented, the spring passes through it, and is secured in place by a nut, $c'$; but it may be made in sections, if desired, and the end of the spring may be upset, as shown in Fig. 7, and the sections then secured together by bolts, rivets, or in any well-known way, the object being to prevent slipping endwise. The said end may also be surrounded with leather or other suitable bushing, as shown by the dotted lines at $b^5$, Fig. 4. The portion $c^2$ is arranged at right angles, or substantially so, to the part $c$, so as to admit of its being connected by a pin or bolt, $c^3$, to a cross-bar or a leaf-spring, $c^4$, or its equivalent, as shown. By this construction of torsion-spring the necessity of confining the spring in journal-boxes near the outside of the body of the vehicle may be dispensed with, and the portion $a^2$ of the spring, being elastic, is permitted to move slightly back and forth as the outer arm of the spring is moved by the action of the downward and upward motion of the body of the vehicle, which construction prevents cramping or twisting of the leaf-springs or bars, to which the torsion-springs are attached, as hereinbefore mentioned. By this construction of the coupling, as hereinbefore described, only one bolt is required for connecting it to the leaf-spring, instead of two bolts for connecting the springs by passing through the same, one above the other, as heretofore.

I claim as my invention—

1. A torsion-spring having the rigid arm $b$, the double torsional arms $a'$ $a^2$, one arranged above the other, and the outer arm, $b^5$, substantially as shown and described.

2. The combination of the within-described torsion-spring provided at its outer end with the spring-coupling $c$, substantially as shown and described, and for the purpose set forth.

3. The torsion-spring $a'$ $a^2$, in combination with the coupling $c$ and a leaf semi-elliptic spring, spring-bar, or its equivalent, substantially as shown and described.

4. A torsion-spring consisting of the portions $a'$ $a^2$, the portion $a'$ being secured to the vehicle by hooked plates, as specified, so as to be subject to torsional action, and the portion $a^2$ being left free to act, as described, in combination with the part or arm $b^5$, a coupling, and a leaf-spring or spring-bar, substantially as above set forth.

RICHARD MULHOLLAND.

Witnesses:
GEO. P. ISHAM,
GEO. A. FRENCH.